Feb. 27, 1968 R. L. JAMES 3,371,252

SOLENOID DRIVE SYSTEM

Filed Oct. 12, 1964 3 Sheets-Sheet 1

INVENTOR.
ROBERT L. JAMES
BY Herbert L. Davis
ATTORNEY

Feb. 27, 1968 R. L. JAMES 3,371,252

SOLENOID DRIVE SYSTEM

Filed Oct. 12, 1964 3 Sheets-Sheet 2

INVENTOR.
ROBERT L. JAMES
BY Herbert L. Davis
ATTORNEY

INVENTOR.
ROBERT L. JAMES
BY [signature]
ATTORNEY

United States Patent Office 3,371,252

Patented Feb. 27, 1968

3,371,252

SOLENOID DRIVE SYSTEM

Robert L. James, Bloomfield, N.J., assignor to The Bendix Corporation, Teterboro, N.J., a corporation of Delaware Filed Oct. 12, 1964, Ser. No. 403,239

12 Claims. (Cl. 317—123)

ABSTRACT OF THE DISCLOSURE

Means for effecting a solenoid operating pulse having a staircase voltage waveform, said means including a main pulse generator, first and second delay pulse generators controlled by the main pulse generator and first and second pulse width generators. The operation of the first and second pulse width generators is initiated by the main pulse generator. The operation of the first pulse width generator is terminated after a first predetermined delay period by the first delay pulse generator and the operation of the second pulse width generator is terminated after a greater second predetermined delay period by the second delay pulse generator. A first gating means is controlled by the first pulse width generator and a second gating means is controlled by the second pulse width generator. An electrical network is controlled by the first and second gating means for effecting the pulse of said staircase voltage waveform.

This invention relates to improvements in a solenoid drive system and, more particularly, to a novel system for pulsing an "on" and "off" operation of a solenoid in which both pulse width and pulse frequency may be manually and independently adjustable and in which provision is made for avoiding the relatively large delays in solenoid "pull-in" and "drop-out" times associated with previous equipment.

An object of the invention is to provide an improved solenoid drive system for effecting a solenoid operating pulse having a "staircase" voltage wave form in which a first high amplitude step produces a rapid rise of current in a solenoid load to minimize solenoid "pull-in" time, while a second step of low voltage amplitude permits solenoid "drop-out" from a relatively low holding current level to minimize "drop-out" time.

Another object of invention is to provide a solenoid drive system effecting a high solenoid actuating current pulse which lasts only during "pull-in" time, while, for the remaining time of the actuation of the solenoid, the energizing current is at a relatively lower holding current value so that the heating of transistor switches used in the system is minimized and, in addition, the transistor switches are always operated either fully saturated "on" or "off" so as to reduce losses and heating.

Another object of invention is to provide a novel system for slaving two turn-off pulse generators to a single frequency-controlling pulse generator while minimizing interaction between these pulse generators so as to preserve independence between the controls for pulse width and for frequency of the equipment output pulse, which system may be particularly adapted for use to pulse "on" and "off" operation of a solenoid operated valve controlling flow of a propellant medium to a rocket combustion chamber.

Another object of invention is to provide in such a system novel means whereby both the pulse width and the pulse frequency may be manually and independently adjustable by the operator.

Another object of invention is to provide in such a system novel means for avoiding the relatively large delays in solenoid "pull-in" and "drop-out" times associated with previous equipment in the provision of an electrical network for effecting a composite type output pulse having a so-called "staircase" voltage wave form, including a first high amplitude step to produce the rapid rise of energizing current in the solenoid load to minimize solenoid "pull-in" time, followed by a second step of low voltage amplitude to retain the solenoid in an actuated condition while permitting the solenoid to subsequently "drop-out" from a relatively low holding current level so as to minimize the "drop-out" time of the solenoid.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 2:
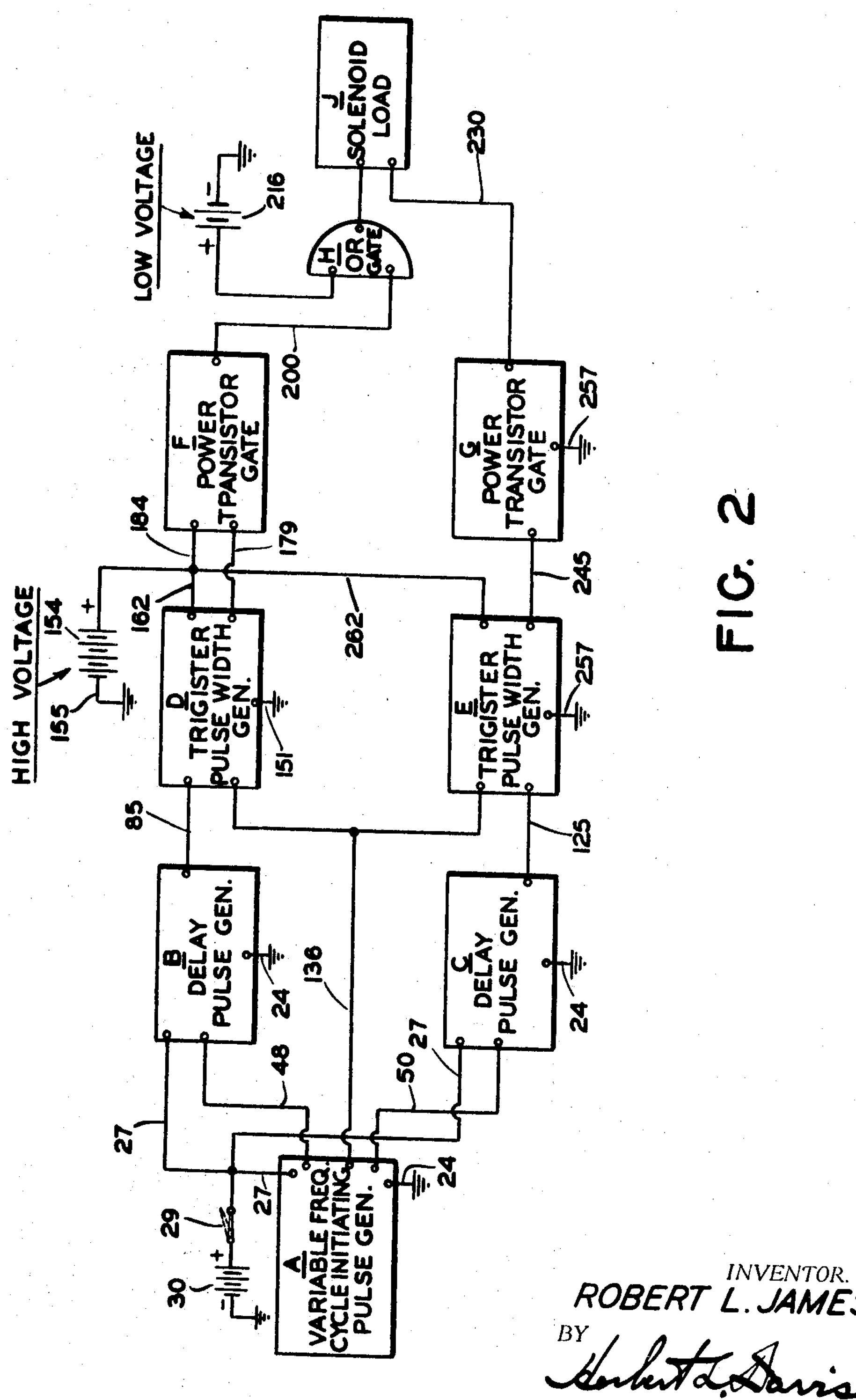
FIGURE 2 is a block diagram of a solenoid drive system embodying the present invention.
Figure 3:
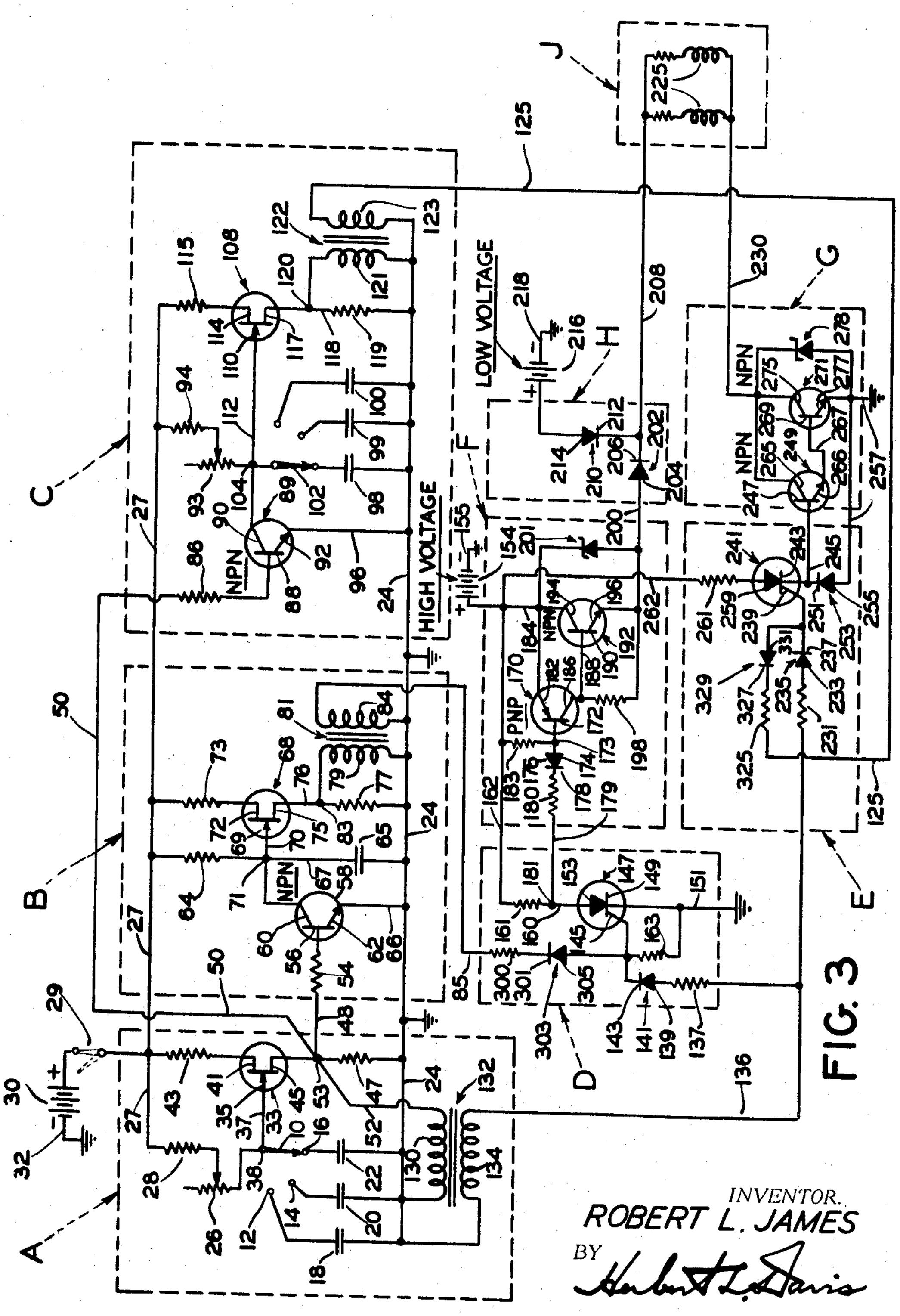
FIGURE 3 is a schematic wiring diagram of a solenoid drive system embodying the present invention.

Referring to the drawings of FIGURES 2 and 3, a variable frequency cycle initiating pulse generator is indicated by the block A. As shown in FIGURE 3, the pulse generator A includes operator-operative means to control the repetition rate of the frequency generator by operation of a switch 10 which may be adjustably positioned to selectively close switch contacts 12, 14, and 16 leading to plates of timing capacitors 18, 20, and 22, while the opposite plates of these capacitors are connected to ground through a conductor 24.

The switch 10 is, in turn, serially connected through a variable resistor 26, a fixed resistor 28, a conductor 27, and an operator control switch 29 to the positive terminal of a source of direct current or battery 30 having its negative terminal connected to ground at 32. Upon the operator closing the switch 29, the battery 30 applies, through the selector switch 10, a charging current to the selected capacitor 18, 20, or 22.

The capacitors 18, 20, and 22 are of different capacity and the charging time for the respective capacitors will vary, of course, with the capacity thereof and the amplitude of the charging current applied through the adjustable resistor 26 and resistor 28. Upon the charge applied to the selected capacitor reaching a predetermined value or the firing level effective to initiate the operation of a unijunction transistor 33, the selected capacitor discharges, as hereinafter explained.

The unijunction transistor 33 has an emitter 35 connected by a conductor 37 to a point 38 on the switch arm 10 and in the charging circuit intermediate the selected capacitor 18, 20, or 22 and the variable resistor 26 to sense the level of the charge applied to the selected capacitor. The unijunction transistor 33 also has a base 41 connected through a resistor 43 and the conductor 27 to the positive terminal at the source of electrical energy 30 and a base 45 connected through a resistor 47 to the grounded conductor 24 and thereby to the negative terminal of the battery 30 through the grounded conductor 32. The bases 41 and 45 of the unijunction transistor 33 are thereby biased by the battery 30 so as to normally maintain the path from the emitter 35 to the base 45 open in the absence of the charge applied to the selected timing capacitor 18, 20, or 22 being at the critical firing level for the unijunction transistor 33.

Upon the charge applied to the selected timing capacitor 18, 20, or 22 reaching the predetermined value or firing level of the unijunction transistor 33, the transistor 33 will fire and there will be a conductive path from the emitter 35 to the base 45 of the transistor 33 and through the resistor 47 to ground to effect the discharge of the selected capacitor 18, 20, or 22.

Upon the transistor 33 firing, the timing capacitor will then discharge through the transistor 33 and an exponential type pulse will be applied through output conductors 48, 50, and 52 leading from a point 53 between the base 45 and the resistor 47 for effecting the several control functions, as hereinafter explained, in which the output pulse applied through the conductor 52 is effective to simultaneously initiate the operation of the trigistor pulse width generators D and E, while the output pulse from the pulse generator A applied through the conductors 48 and 50, as shown in FIGURE 2, is applied so as to simultaneously initiate the operation, respectively, of the delay pulse generators of blocks B and C, which, in turn, serve, after predetermined delay periods, to apply pulses to stop first the operation of trigistor D and thereafter stop the operation of trigistor E.

*Delay pulse generator (B)*

In the delay pulse generator of block B, the conductor 48 is connected through a resistor 54 to the base 56 of an NPN type transistor 58 having a collector 60 and emitter 62. The collector 60 is connected through a resistor 64 and the conductor 27 to the positive terminal of the battery 30. The emitter 62 is connected through a conductor 66 to the grounded conductor 24, which is, in turn, connected to the negative terminal of the battery 30 through a grounded conductor 32. A capacitor 65 is connected by a conductor 67 to the collector 60 and through the conductor 66 to the emitter 62 of the transistor 58, with one plate of the capacitor 65 being connected through the conductor 67 to the resistor 64 and thereby to the positive terminal of the battery 30, while the opposite plate of the capacitor 65 is connected through the grounded conductor 24 to the negative terminal of the battery 30. Thus, during the period when the transistor 58 is nonconductive, the capacitor 65 is effectively charged by the battery 30 through the resistor 64.

The arrangement is such that, upon the exponential type pulse from the pulse generator of block A being applied through the conductor 48 and resistor 54 to the base 56 of the transistor 58, the transistor 58 is thereby saturated so that, whatever charge may, at the time, be applied to the capacitor 65, it is thereupon discharged through transistor 58, resetting the charge on the capacitor 65 to zero.

Now, upon the termination of the exponential output pulse from the pulse generator of block A, the transistor 58 is once again returned to a nonconductive state, whereupon the capacitor 65 will start to charge through the resistor 64 from the battery 30, as heretofore explained. This references the buildup of the charge on the capacitor 65 to start at the same time as the exponential type pulse generated by the pulse generator of block A terminates.

The capacitor 65 is thereafter charged through the resistor 64 until the charge thereon reaches a predetermined value determined by the firing point of a second unijunction transistor 68 having an emitter 69 connected through a conductor 70 to a point 71 on the conductor 67 and in the charging circuit of the capacitor 65 intermediate the resistor 64 and the capacitor 65. The unijunction transistor 68 has a base 72 connected through a resistor 73 and the conductor 27 to the positive terminal of the battery 30 and a base 75 connected through a conductor 76 and a resistor 77 to the grounded conductor 24 and thereby to the negative terminal of the battery 30.

The bases 72 and 75 of the unijunction transistor 68 are biased by the battery 30 so as to normally maintain the path from the emitter 69 to the base 75 open in the absence of the capacitor 65 being charged to a voltage at the predetermined value or firing level of the transistor 68.

Further, connected across the resistor 77 is a primary winding 79 of a transformer 81. One end of the primary winding 79 is connected to the grounded conductor 24, while the opposite end of the primary winding 79 is connected at a point 83 on the conductor 76 between the resistor 77 and the base 75 of the unijunction transistor 68. Inductively coupled to the primary winding 79 of the transformer 81 is a secondary winding 84 having one end connected to the grounded conductor 24 and the opposite end connected by a conductor 85 to control the operation of the trigistor pulse width generator D.

In the aforenoted arrangement, upon the capacitor 65 being charged to the firing point of the unijunction transistor 68, as sensed at the emitter 69, the unijunction transistor 68 fires and there is effected a discharge path for the capacitor 65 between the emitter 69 and the base 75. Thereupon, the capacitor 65 discharges through the unijunction transistor 68, the resistor 77, and the primary winding 79 of the transformer 81 to the grounded conductor 24. This discharge of the capacitor 65 through the primary winding 79, in turn, induces a voltage in the secondary winding 84 of the transformer 81, which is applied through the conductor 85 to provide the controlling action on the trigistor pulse width generator D, as hereinafter explained.

*Delay pulse generator (C)*

At the same time that the output pulse from the pulse generator A is applied through conductor 48 to the delay pulse generator B, such output pulse is also applied through the conductor 50 to the delay pulse generator C. The conductor 50 is connected through a resistor 86 to the base 88 of an NPN type transistor 89 having a collector 90 and an emitter 92. The collector 90 is connected through an adjustable resistor 93, a fixed resistor 94, and the conductor 27 to the positive terminal of the battery 30. The emitter 92 is connected through a conductor 96 to the grounded conductor 24, which is, in turn, connected to the negative terminal of the battery 30.

Timing capacitors 98, 99, and 100 may be selectively connected across the collector 90 and emitter 92 by an operator-operative selector switch 102. Each of the timing capacitors 98, 99, and 100 have one plate connected to the grounded conductor 24 and the opposite plate selectively connected by the switch 102 to a point 104 intermediate the collector 90 and adjustable resistor 93.

Thus, during the period when the NPN type transistor 89 is nonconductive, the selected capacitor 98, 99, or 100 is effectively charged by the battery 30 through the adjustable resistor 93 and fixed resistor 94. The arrangement is such that, upon the exponential type pulse from the pulse generator of block A being applied through the conductor 50 and resistor 86 to the base 88 of the transistor 89, the transistor 89 is thereby saturated so that whatever charge may be applied to the selected capacitor 98, 99, or 100 is thereupon discharged through the transistor 89, resetting the charge on the selected capacitor 98, 99, or 100 to zero.

Now, upon the termination of the exponential output pulse from the pulse generator of block A, the transistor 89 is once again returned to a nonconductive state, whereupon the selected capacitor 98, 99, or 100 will start to charge through the adjustable resistor 93 and fixed resistor 94 from the battery 30, as heretofore explained. This references the buildup of the charge on the selected capacitor 98, 99, or 100 to start at the same time as the exponential type output pulse generated by the pulse generator of block A terminates.

The selected capacitor 98, 99, or 100 is thereupon charged through the resistors 93–94 until it reaches a predetermined value determined by the firing point of a third unijunction transistor 108 having an emitter 110 connected through a conductor 112 to the point 104 intermediate the resistor 93 and the selected capacitor 98, 99, or 100. The unijunction transistor 108 has a base 114 connected through a resistor 115 and the conductor 27 to the positive terminal of the battery 30 and a base 117 connected through a conductor 118 and a resistor 119 to the grounded conductor 24 and thereby to the negative terminal of the battery 30.

The bases 114 and 117 of the unijunction transistor 108 are biased by the battery 30 so as to normally maintain the path from the emitter 110 to the base 117 open in the absence of the charging voltage applied to the selected capacitor 98, 99, or 100 exceeding the aforenoted predetermined value or firing level of the unijunction transistor 108.

Connected across the resistor 119 is a primary winding 121 of a transformer 122. One end of the primary winding 121 is connected to the grounded conductor 24, while the opposite end of the primary winding 121 is connected at a point 120 on the conductor 118 intermediate the base 117 and the resistor 119.

The transformer 122 has a secondary winding 123 inductively coupled to the primary winding 121, with one end of the winding 123 connected to the grounded conductor 24 and the opposite end of the secondary winding 123 connected by a conductor 125 to control the trigistor pulse generator E.

Upon the selected capacitor 98, 99, or 100 being charged to the firing level of the third unijunction transistor 108, such charge applied to the emitter 110 causes the unijunction transistor 108 to fire, closing a path between the emitter 110 and the base 117 for discharging the selected capacitor.

Upon the firing of the unijunction transistor 108, the selected capacitor 98, 99, or 100 thereupon discharges through the unijunction transistor 108, resistor 119, and primary winding 121 of the transformer 122, which discharge pulse, in turn, induces an exponential type pulse into the secondary winding 123 which is applied through the conductor 125 to control the operation of the trigistor pulse width generator E, as hereinafter explained.

*Controlled operation of the trigistor pulse width generators*

Further, in the variable frequency cycle initiating pulse generator of block A, the discharge of the selected capacitor 18, 20, or 22 through the unijunction transistor 33 is also applied through the conductor 52 to a primary winding 130 of a transformer 132. One end of the primary winding 130 is connected to the grounded conductor 24, while the opposite end of the primary winding 130 is connected to the conductor 52 leading from the point 53 between the base 45 of the unijunction transistor 33 and the resistor 47 of the variable initiating pulse generator of block A.

The transformer 132 has a secondary winding 134 inductively coupled to the primary winding 130, with one end of the secondary winding 134 connected to ground at 24, while the opposite end of the secondary winding 134 is connected to an output conductor 136 leading from the pulse generator of block A to the trigistor pulse width generators of blocks D and E, respectively, for simultaneously applying output pulses for initiating operation of the trigistor pulse width generators D and E with the initiation of operation of the delay pulse generators of B and C effected by output pulses applied through conductors 48 and 50; while the controlling pulse applied through the conductor 85 from the delay pulse generator B serves to stop the operation of the trigistor pulse width generator D and the controlling pulse applied through the conductor 125 from the delay pulse generator of block C serves to stop the operation of the trigistor pulse width generator E, as hereinafter explained in greater detail.

*Trigistor pulse width generator (D)*

In initiating the operation of the trigistor pulse width generator D, the exponential type output pulse from the pulse generator A applied through the conductor 52 to the primary winding 130 of the transformer 132 induces a corresponding pulse in the secondary winding 134 of the transformer 132 which is then applied as a positive going output pulse from the pulse generator A to the conductor 136. The output conductor 136 leads into the trigistor D and through a resistor 137 to an anode 139 of a diode 141 having a cathode 143 connected to a gating terminal 145 of a silicon controlled rectifier 147. The silicon controlled rectifier 147 has a cathode 149 connected through a grounded conductor 151 and thereby to a negative terminal of a high voltage source or battery 154 which has a negative terminal connected to ground by a conductor 155.

The silicon controlled rectifier 147 also has an anode 153 connected through a conductor 160, resistor 161, and conductor 162 to the positive terminal of the high voltage source or battery 154. A limiting resistor 163 is connected between the gating terminal 145 and the grounded conductor 151.

The silicon controlled rectifier 147 operates similar to a thyratron and passes current from anode 153 to cathode 149 after a positive going gating pulse is applied through the diode 141 by the exponential type pulse induced in the secondary winding 134 of the transformer 132. This gating pulse applied then through the diode 141 starts the operation of the trigistor pulse width generator D, and current flows through the silicon controlled rectifier 147 from the anode 153 to the cathode 149.

*Power transistor gate (F)*

This current flow through the silicon controlled rectifier 147 is sensed at the transistor gate F. The transistor gate F includes a PNP type transistor 170 having a base 172 connected by a conductor 173 to an anode 174 of a diode 176 having a cathode 178 connected through a resistor 180 and a conductor 179 to a point 181 on the conductor 160 connecting the resistor 161 to ahe anode 153 of the silicon controlled rectifier 147 so that the controlled current flow through the rectifier 147 will be sensed at the base 172 of the transistor 170. A limiting resistor 183 is connected between the conductor 173 leading from the base 172 of the transistor 170 and the conductor 162 leading from the positive terminal of the battery 154.

The PNP type transistor 170 has an emitter 182 connected through a conductor 184 to the conductor 162 and thereby to the positive terminal of the high voltage source or battery 154 and a collector 186 connected through a conductor 188 to a base 190 of an NPN type transistor 192. The NPN type transistor 192, in turn, has a collector 194 connected through the conductor 184 to the positive terminal of the battery 154 and an emitter 196 connected to an output conductor 200. A resistor 198 also leads from the collector 186 of the PNP type transistor 170 to the output conductor 200. The diode 176 is arranged so as to protect the PNP type transistor 170 from the effects of transient back voltages arising upon the opening of the conductive path between the anode 153 and the cathode 149 of the silicon controlled rectifier 147, which might otherwise cause damage to the transistor 170.

The flow of current from the anode 153 to the cathode 149 of the silicon controlled rectifier 147 as sensed at the base 172 of the PNP type transistor 170 renders the transistor 170 conductive from the emitter 182 to the collector 186, which action is, in turn, sensed at the base 190 of the NPN type transistor 192 to render the transistor 192 also conductive from the collector 194 to the emitter 196, whereupon there is effected a closed path through the transistor 192 from the conductor 184 leading from the positive terminal of the high source of voltage or battery 154 to the output conductor 200 leading from the power transistor gate F.

A zener diode 201 has a cathode element connected to the collector 194 and an anode element connected to the emitter 196 of the transistor 192 so as to protect the transistor 192 from the effects of transient back voltages arising upon the opening of the conductive path between the collector 194 and the emitter 196, which might otherwise cause damage to the transistor 192.

*"OR" gate (H)*

The emitter 196 of the transistor 192 is further connected by the output conductor 200 from the power transistor gate F to an input to an "OR" gate H. The "OR" gate H includes a diode 202 having an anode 204 connected to the conductor 200 and a cathode 206 connected to an output conductor 208 leading from the "OR" gate H. The "OR" gate H includes a second diode 210 having a cathode 212 connected to the output conductor 208 and an anode 214 connected to a positive terminal of a battery or low voltage source 216 having a negative terminal 218 connected to ground. The diodes 202 and 210 form gating elements of the "OR" gate of block H.

The output conductor 208 leads from the "OR" gate H to one terminal of solenoid windings 225, which may form actuating elements for a rocket fuel valve controlled by the system of the present invention. The opposite terminal of the solenoid windings 225 is connected by a second conductor 230 leading to a power transistor gate of block G, as will be explained hereinafter.

*Trigistor pulse generator (E)*

Simultaneously with the initiation of the operation of the trigistor pulse width generator D by the exponential output pulse from the pulse generator A, there is applied through the conductor 136 to the trigistor pulse width generator E a positive going pulse which initiates the operation thereof.

This positive going pulse is applied through a resistor 231 to an anode 233 of a diode 235 having a cathode 237 connected to a gating terminal 239 of a silicon controlled rectifier 241.

The silicon controlled rectifier 241 has a cathode 243 connected by an output conductor 245 to a base 247 of an NPN type transistor 249 in the power transistor gate of block G. There is also connected to the output conductor 245 a cathode element 251 of a diode 253 having an anode element 255 connected to a grounded conductor 257. The diode 253 acts to prevent flow of current directly to the grounded conductor 257 through the output conductor 245 leading from the rectifier 241.

The silicon controlled rectifier 241 has an anode 259 connected through a resistor 261 and a conductor 262 to the positive terminal of the high voltage source or battery 154, having its negative terminal connected to ground through the conductor 155.

Thus, the diode 253 acts to prevent flow of current directly from the conductor 245 to the grounded conductor 257 while permitting the flow of a positive going pulse from the grounded conductor 257 to the cathode 243 upon a negative going pulse being applied to the gating terminal 239 of the silicon controlled rectifier 241 through the conductor 125, as hereinafter explained.

The silicon controlled rectifier 241 operates similar to a thyratron and passes current from the anode 259 to the cathode 243 upon a positive going gating pulse being applied through the diode 235 to the gating terminal 239 by the voltage induced in the secondary winding 134 of the transformer 132. This positive going gating pulse applied then through the diode 235 starts the operation of the trigistor pulse width generator E, whereupon current flows through the silicon controlled rectifier 241 from the anode 259 to the cathode 243.

*Power transistor gate (G)*

This current flow in the silicon controlled rectifier 241 is sensed in the power transistor gate G at the base 247 of the transistor 249. The transistor 249 of the NPN type has a collector element 265 connected to the conductor 230 leading from one terminal of the solenoid windings 225 and an emitter element 266 connected by a conductor 267 to a base 269 of a second NPN type transistor 271. The transistor 271 has a collector element 275 also connected to the conductor 230 leading from the solenoid windings 225 and an emitter element 277 connected to the grounded conductor 257.

The flow of current from the anode 259 to the cathode 243 of the silicon controlled rectifier 241 as sensed at the base 247 of the NPN type transistor 249 renders the transistor 249 conductive from the collector 265 to the emitter 266, which action is, in turn, sensed at the base 269 of the transistor 271 to render the transistor 271 also conductive from the collector 275 to the emitter 277, whereupon there is effected a closed path through the transistor 271 from the conductor 230 to the grounded conductor 257 to complete the energizing path for the controlled solenoid windings 225. This energizing path is initially completed from the high voltage source or battery 154 through the transistor 192 of the power transistor gate F, through the diode 202 of the "OR" gate H, the solenoid windings 225, the conductor 230 and transistor 271 of the power transistor gate G to the grounded conductor 257 and thereby returning to the high voltage source or battery 154 through the grounded conductor 155.

A zener diode 278 has a cathode element connected to the collector 275 and an anode element connected to the emitter 277 of the transistor 271 and is so arranged as to protect the transistor 271 from the effects of transient back voltages arising upon the opening of the conductive path between the collector 275 and the emitter 277, which might otherwise cause damage to the transistor 271.

*Voltage wave form*

Figure 1:
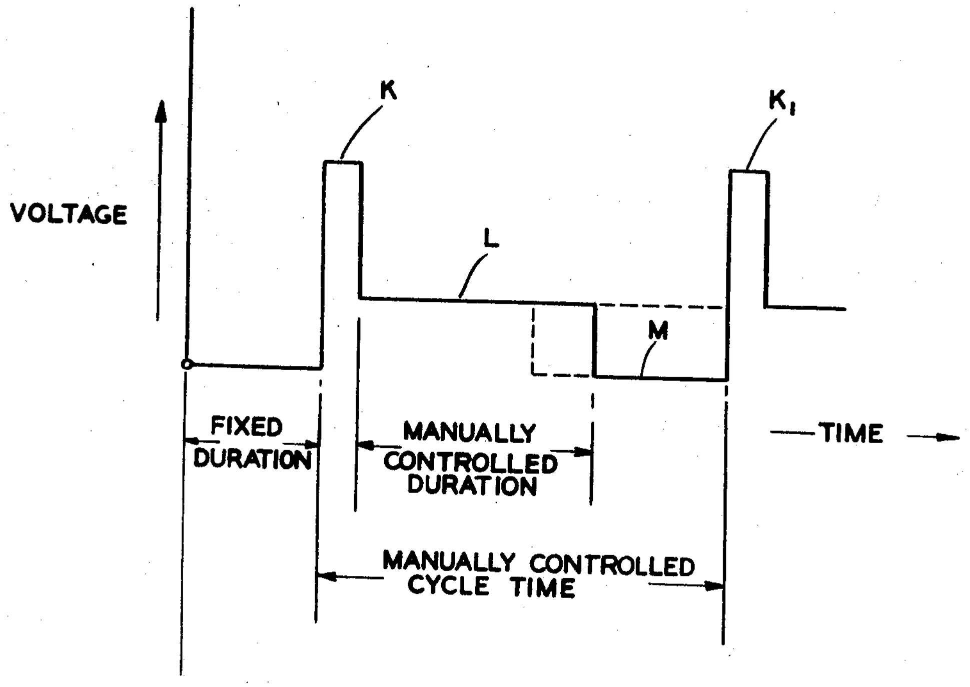
FIGURE 1 is a graphical illustration of a composite type "staircase" voltage wave form output pulse effected by the present invention for actuating a solenoid.

The aforenoted initial energization of the solenoid windings 225 by the high voltage source 154 is for a fixed duration, shown graphically in FIGURE 1 by the letter K, until the capacitor 65 of the delay pulse generator B has been charged to the firing level of the unijunction transistor 68, at which time the unijunction transistor 68 fires, effecting energization of the primary winding 79 of the transformer 81, whereupon there is induced in the secondary winding 84 of the transformer 81 a corresponding negative going pulse which is applied through the conductor 85 to the trigistor pulse width generator of block D to terminate the operation thereof.

The pulse thus applied through the conductor 85 is a negative going pulse and is applied through a resistor 300 to the cathode element 301 of a diode 303 having an anode 305 connected to a gating terminal 145 of the silicon controlled rectifier 147, while the positive going portion of the pulse is applied from the secondary winding 84 through the grounded conductor 24 to the grounded conductor 151 and thereby to the cathode 149 of the rectifier 147 so as to render the same nonconductive.

This negative going gating pulse applied through conductor 85 and diode 303 then terminates the operation of the trigistor pulse width generator D and the current flow through the silicon controlled rectifier 147. This cessation of current flow as sensed through the limiting resistor 183 is effective at the base 172 of the transistor 170 of the power transistor gate F to thereupon render the transistor 170 nonconductive and, in turn, render, also, the transistor 192 of the power transistor gate F nonconductive, whereupon the high voltage source or battery 154 is rendered ineffective to energize the solenoid windings 225.

The diode 210 of the "OR" gate H upon the opening of the circuit to the high voltage source or battery 154 then becomes effective to connect the low voltage source or positive terminal of the battery 216 to the conductor 208 and thereby through the solenoid windings 225 to effect the energization thereof at a lower voltage level, as indicated graphically in FIGURE 1 by the letter L, inasmuch as the trigistor pulse width generator E will continue in operation for a controlled duration determined by the capacitor 98, 99, or 100 selected by the manually operated switch 102 of the delay pulse generator C.

Thus, upon the charge applied to the selected capacitor 98, 99, or 100 of the delay pulse generator C reaching the firing level for the unijunction transistor 108, the transistor 108 will fire, effecting a discharge circuit for the selected capacitor through the resistor 119 and primary winding 121 of the transformer 122. Upon the energization of the primary winding 121 by the discharging pulse from the selected capacitor, there will be induced in secondary winding 123 of the transformer 122 a second negative going pulse which is applied through the conductor 125 to terminate the operation of the trigistor pulse width generator of block E. This negative going pulse is applied through the line 125 to a resistor 325 and thereby to a cathode 327 of a diode 329 having an anode element 331 connected to the gating terminal 239 of the silicon controlled rectifier 241, while the positive going portion of the pulse is applied from the secondary winding 123 through the grounded conductor 24 to the grounded conductor 257 and thereby through the diode 253 to the cathode 243 of the silicon controlled rectifier 241 to render the same nonconductive.

This negative going gating pulse applied then through conductor 125 and diode 329 terminates the operation of the trigistor pulse width generator E and terminates the flow of current through the silicon controlled rectifier 241 from the anode 259 to the cathode 243. This cessation of current flow is sensed at the base 247 of the transistor 249 of the power transistor gate G so as to thereupon render the NPN type transistor 249 nonconductive and, in turn, effect a corresponding controlling action on the NPN type transistor 271 to open the power transistor gate G and terminate the flow of current from the low voltage source or battery 216 through the solenoid windings 225 to the ground. The solenoid windings 225 will then be completely deenergized, as indicated graphically in FIGURE 1 by the letter M.

The time cycle for effecting the energization of the windings 225 from the high voltage source 154, as indicated graphically in FIGURE 1 by the letter K, the low level voltage from the low voltage source 216, as indicated at L, and the null voltage condition M, to the period of reenergization at the high voltage level, as indicated at $K_1$, may be controlled manually by operation of the switch 10 so as to select the capacitor 18, 20, or 22 to be effective for determining the time of operation of the variable frequency cycle initiating pulse generator of block A, while the duration of the low level voltage condition L may be controlled manually by the selective operation of the switch 102 to determine the capacitor 98, 99, or 100 to be effective in timing the operation of the delay pulse generator C.

*Operation*

The system of the present invention provides a novel means for controlling the repetition rate of energization of a solenoid winding through the provision of an operator-operative switch 10 of the variable frequency cycle initiating pulse generator of block A, shown in FIGURES 2 and 3, and also includes a novel means for controlling the periods of energization of the solenoid windings 225 through the provision of the operator-operative switch 102 of the delay pulse generator C.

Moreover, in the aforenoted arrangement, the actuating pulse has a "staircase" voltage wave form, as shown graphically in FIGURE 1, in which the first high amplitude step, designated by the letter K, produces a rapid rise of current in a solenoid load so as to minimize the solenoid "pull-in" time, while a second step of low voltage amplitude, indicated by the letter L, allows the solenoid to "drop-out" from a relatively low holding current level, thus minimizing "drop-out" time.

Moreover, in the system of the present invention, the high solenoid current pulses last only during "pull-in" time and, for the remaining time, the current is at a relatively lower holding current value or "off" entirely so that the heating of transistor switches used in the system is minimized. In addition, the transistor switches are always operated either full saturated "on" or "off," reducing losses or heating.

In the operation of the solenoid driver system, as shown in the block diagram of FIGURE 2 and the wiring diagram of FIGURE 3, the cycle initiated pulse generator of block A (manually controlled in repetition rate by the selective operation of the switch 10) turns "on" the two trigistor pulse width generators of blocks D and E and, at the same time, starts the timing of the two delay pulse generators of blocks B and C.

Pulses from the pulse generators B and C turn "off" the trigistor pulse width generators D and E, respectively, after pre-set time intervals. This action determines the duration of the trigistor output operation, and, hence, the "on" input time of the two power transistor gates of blocks F and G. These power transistor gates F and G close current paths simultaneously from the high voltage source 154 and the low voltage source 216 to two isolating diodes 202 and 210 of the "OR" gate of block H. A current from the higher voltage supply 154 passes through the "OR" gates to control the solenoid windings 225 and, from there, through the power transistor gate of block G.

After a short delayed time allowed for pull in, a turn off pulse from the delay pulse generator B turns off the trigistor of block D and its high voltage transistor gate of block F. The resulting removal of this high voltage supply 154 from the "OR" gate H allows a relatively low holding current from the low voltage supply 216 to pass through the "OR" gate diode 210 to the solenoid load 225 and through the power transistor gate G.

As determined by a manually controlled delay set into the delay pulse generator C by the selective operation of the switch 102, the delay pulse generator C applies a turn off pulse to the trigistor of block E, which, in turn, causes the low voltage transistor gate G to open, causing solenoid "drop-out" after a minimum current delay time, as shown graphically in FIGURE 1, whereupon the solenoid windings 225 will be completely deenergized, as indicated graphically by the letter M of FIGURE 1.

Moreover, after the discharge of the selected capacitor 18, 20 or 22 through the discharge path between the emitter 35 and base 45 of the unijunction transistor 33 and the resistor 47 has been completed as heretofore explained, the discharge path between the emitter 35 and base 45 is opened upon the charge applied to the selected capacitor 18, 20, or 22 being discharged to zero.

Thereafter, a charging cycle for the selected capacitor 18, 20, or 22 is once again initiated through the charging circuit, including the resistors 26 and 28, for a predetermined time interval necessary to bring the charge applied to the selected capacitor to the critical value for firing the unijunction transistor 33, which charging time interval will be dependent upon the capacity of the selected capacitor 18, 20, or 22 and the adjustment of the timing resistor 26.

The cycle of operation of the pulse generator A will then be repeated, as heretofore explained, so long as the operator-operative switch 29 remains in the closed position as shown. The cyclic operation of the pulse generator A is terminated by the operator opening the control switch 29.

The cycle time between the initiation of the high voltage phase K of the solenoid energizing pulse and the initiation of the high voltage phase $K_1$ of the next succeeding pulse may be manually controlled, as shown graphically in FIGURE 1, by the selective positioning of the operator-operative switch arm 10 so as to select the desired capacitor 18, 20, or 22 and by the operator-operative adjustment of the variable timing resistor 26 to thereby set the cycle time or the charging time of the selected capacitor.

Furthermore, the duration of the low level voltage phase L or low level holding current for the solenoid 225 is set by the adjustment of the switch arm 102 to select the capacitor 98, 99, or 100 and adjustment of the timing resistor 93.

The selective capacitors 98, 99, and 100 each have a different capacity and, in conjunction with the adjustable timing resistor 93, may be so selected as to vary the duration of the low level voltage phase L, as indicated by dotted lines in FIGURE 1, from a duration of time of less than that indicated at L up to the extreme condition of the time for the initiation of the succeeding high voltage phase $K_1$ as controlled by the operator-operative switch arm 10, in which case there would be no period M of complete deenergization of the solenoid, which would, of course, be undesirable in effecting the "on" and "off" pulsing operation of the solenoid.

In practice, the period M of complete deenergization of the solenoid will be so selected as to effect the desired operation of the solenoid J. Thus, through the operator-operative switch arm 10 and adjustable resistor 26 and the operator-operative switch arm 102 and adjustable resistor 93, both the pulse frequency, or cycle time, and the pulse width, or duration, of the low level voltage phase L for energizing the solenoid J may be manually and independently adjustable.

Furthermore, through the system herein provided, there may be avoided the relatively large delays in solenoid "pull-in" and "drop-out" times heretofore associated with previous equipment for controlling the energization of a solenoid. In the present "on" and "off" control system, the solenoid J may operate a valve controlling the flow of a propellant medium to a rocket combustion chamber with the rapid "pull-in" and "drop-out" control of the solenoid operated valve mechanism J effecting a desired critical and improved mode of operation.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. Means for effecting an electrical pulse of a staircase voltage wave form, said means comprising a main pulse generator, a first delay pulse generator, a second delay pulse generator, said first and second delay pulse generators being controlled by the main pulse generator, first and second pulse width generators, said first and second pulse width generators having an operation of each initiated by said said main pulse generator, said first pulse width generator having said initiated operation terminated after a first predetermined delay period by said first delay pulse generator, said second pulse width generator having said initiated operation terminated after a greater second predetermined delay period by said second delay pulse generator, a first gating means controlled by the first pulse width generator, a second gating means controlled by the second pulse width generator, and an electrical network controlled by the first and second gating means so as to effect said electrical pulse of said staircase voltage wave form.

2. The combination defined by claim 1 in which said main pulse generator includes an operator-operative means to select a predetermined frequency of operation of the main pulse generator and thereby a frequency of the control by said main pulse generator of said first and second delay pulse generators and of the initiation of operation of said first and second pulse width generators.

3. The combination defined by claim 1 in which said second delay pulse generator includes an operator-operative means to change the second predetermined delay period.

4. The combination defined by claim 1 in which the electrical network includes an OR gate, a high voltage source controlled by the first gating means and effective through said OR gate to energize said electrical network upon the first and second pulse width generators being rendered effective to control the first and second gating means in one sense, a low voltage source controlled by said OR gate and effective through said OR gate to energize said electrical network upon the first pulse width generator being rendered ineffective by the first delay pulse generator to control said first gating means in said one sense.

5. The combination defined by claim 1 in which the electrical network includes an OR gate, a high voltage source controlled by the first gating means and effective through said OR gate to energize said electrical network upon the first and second pulse width generators being rendered effective to control the first and second gating means in one sense, a low voltage source controlled by said OR gate and effective through said OR gate to energize said electrical network upon the first pulse width generator being rendered ineffective by the first delay pulse generator to control said first gating means in said one sense, and said second pulse width generator being thereafter rendered ineffective by the second delay pulse generator to control said second gating means in said one sense so as to thereupon reduce the energization of the electrical network to a null value by rendering the low voltage source ineffective to energize said network.

6. The combination defined by claim 5 in which said main pulse generator includes an operator-operative frequency changing means to select a predetermined frequency of operation of the main pulse generator and thereby a frequency of control by said main pulse generator of said first and second delay pulse generators and of the initiation of operation of said first and second pulse width generators, and the second delay pulse generator including an operator-operative means to change the second predetermined delay period.

7. Means for cyclically effecting electrical pulses of a staircase wave form, said means comprising a main pulse generator for periodically effecting a main pulse, a first delay pulse generator for effecting an auxiliary pulse after a predetermined delay period, a second delay pulse generator for effecting another auxiliary pulse after a greater delay period, operation of said first and second delay pulse generators being initiated by the main pulse effected by the main pulse generator, first and second pulse width generators, operation of said first and second pulse width generators being initiated by the main pulse effected by said main pulse generator and selectively terminated by the auxiliary pulses effected by said first and second delay pulse generators, a first gating means controlled by the first pulse width generator, a second gating means controlled by the second pulse width generator, and an electrical network controlled by the first and second gating means so as to cyclically effect said electrical pulses of said staircase voltage wave form.

8. The combination defined by claim 7 in which said main pulse generator includes an operator-operative frequency varying means to vary the frequency of the main pulses effected by said main pulse generator for controlling said first and second delay pulse generators and said first and second pulse width generators.

9. The combination defined by claim 7 in which at least one of said delay pulse generators includes an operator-operative means to selectively vary the delay period of the auxiliary pulse effected thereby.

10. Means for effecting an electrical pulse having a first high amplitude phase and a subsequent second low amplitude phase, said means comprising a main pulse generator, a first delay pulse generator, a second delay pulse generator, said first delay pulse generator being rendered effective upon the termination of an exponential output pulse from the main pulse generator, the second delay pulse generator being rendered simultaneously effective upon the termination of said exponential output pulse from the main pulse generator, first and second pulse width generators rendered simultaneously effective by the exponential output pulse from the main pulse generator, said first and second pulse width generators being rendered selectively ineffective by the first and second delay pulse generators, an electrical network including first control means selectively operated by the first pulse width generator to terminate the high amplitude phase of the electrical pulse, and said electrical network including second control means selectively operated by the second pulse width generator to terminate the second low amplitude phase of the electrical pulse.

11. The combination defined by claim 10 including a high voltage source controlled by the first control means, gating means including a low voltage source controlled by the second control means, means serially connecting the first control means, the gating means and the second control means, said high voltage source being rendered effective upon selective operation of said first and second control means in one sense, said low voltage source being rendered effective through said gating means upon the high voltage source being rendered ineffective upon selective operation by the first pulse width generator of the first control means in another sense to terminate the high amplitude phase of the electrical pulse, and said low voltage source being thereafter rendered ineffective through said gating means upon selective operation by the second pulse width generator of the second control means in another sense to terminate the second low amplitude phase of the electrical pulse.

12. The combination defined by claim 10 in which said first pulse width generator includes a rectifier to control the operation thereof, means operated by a pulse from the main pulse generator to render the rectifier of the first pulse width generator operative, a second pulse width generator including a rectifier, means operative by a pulse from the main generator to render the rectifier of the second pulse width generator operative, and the first pulse width generator including other means operative by a pulse from the first delay pulse generator to render the rectifier of the first pulse width generator inoperative, and the rectifier of the second pulse width generator including other means operative by a pulse from the second delay pulse generator to render the rectifier of the second pulse width generator inoperative.

References Cited

UNITED STATES PATENTS

| | | | |
|---|---|---|---|
| 3,107,320 | 10/1963 | Brittain et al. | 317—148.5 |
| 3,268,776 | 8/1966 | Reed | 317—148.5 |

LEE T. HIX, *Primary Examiner.*

MILTON O. HIRSHFIELD, *Examiner.*